US00RE50321E

(19) United States
(12) Reissued Patent
Forrest

(10) Patent Number: US RE50,321 E
(45) Date of Reissued Patent: Mar. 4, 2025

(54) SHIPPING CONTAINER ADAPTER

(71) Applicant: Christopher Wayne Forrest, Santa Cruz, CA (US)

(72) Inventor: Christopher Wayne Forrest, Santa Cruz, CA (US)

(73) Assignee: Container Creations LLC, Santa Cruz, CA (US)

(21) Appl. No.: 17/713,796

(22) Filed: Apr. 5, 2022

Related U.S. Patent Documents

Reissue of:
(64) Patent No.: 10,723,547
Issued: Jul. 28, 2020
Appl. No.: 15/497,684
Filed: Apr. 26, 2017

(51) Int. Cl.
*B65D 88/74* (2006.01)
*E04C 2/32* (2006.01)
*E04C 2/52* (2006.01)
*E04D 13/17* (2006.01)

(52) U.S. Cl.
CPC ..... *B65D 88/741* (2013.01); *E04C 2/322* (2013.01); *E04C 2/523* (2013.01); *E04D 13/17* (2013.01)

(58) Field of Classification Search
CPC ..... B65D 88/741; E04C 2/322; E04C 2/523; E04C 2/32; E04D 13/17; E04D 13/172
See application file for complete search history.

(56) References Cited

U.S. PATENT DOCUMENTS 3,227,062 A * 1/1966 Andersson ..... F24D 5/02 52/634
4,297,818 A * 11/1981 Anderson ..... F24F 7/02 454/366
4,351,230 A * 9/1982 Brickner ..... B65D 88/741 34/235
4,480,534 A * 11/1984 Sloan ..... B65D 88/741 454/182
4,570,396 A * 2/1986 Struben ..... E04D 13/064 52/90.2

(Continued)

FOREIGN PATENT DOCUMENTS

AU 2016204752 A1 * 2/2017 ..... E04D 13/1476
GB 2132247 A * 7/1984 ..... E04D 13/1476

OTHER PUBLICATIONS

Finnegan,Mark, Shipping Container Ventilation DIY Guide, Sep. 25, 2014, https://web.archive.org/web/20140925102053/https://www.gatewaycontainersales.com.au/shipping-container-ventilation-diy-guide/ (Year: 2014).*

*Primary Examiner* — Terrence R Till
(74) *Attorney, Agent, or Firm* — Young Basile Hanlon & MacFarlane, P.C.

(57) ABSTRACT

An adapter for a vent system for a cargo container having corrugated panels, has a base portion formed of sheet material, having an outer boundary and an inner boundary, the inner boundary enclosing an area sufficient to accommodate a twelve-inch diameter circle, the base portion shaped to closely conform to geometry of the corrugated panels of the cargo container, an intermediate portion joined in an airtight manner to the inner boundary of the base portion, presenting a surface at a height above an upper extremity of the corrugated geometry of the base portion, and an interface providing a through opening in the surface of the intermediate portion within the area enclosed by the inner boundary of the base portion.

20 Claims, 7 Drawing Sheets

[AMENDED]

(56) References Cited

U.S. PATENT DOCUMENTS

| | | | | |
|---|---|---|---|---|
| 4,664,390 | A * | 5/1987 | Houseman | E04D 13/1476 277/606 |
| 5,472,241 | A * | 12/1995 | Kosik, Jr. | E04D 13/1475 283/42 |
| 7,114,301 | B2 * | 10/2006 | Bibaud | E04D 13/1476 52/219 |
| 7,408,111 | B2 * | 8/2008 | Clark | H02G 3/14 174/66 |
| 7,676,993 | B2 * | 3/2010 | Bonshor | E06B 1/62 52/61 |
| 8,209,923 | B1 * | 7/2012 | Rich | E04D 13/1476 454/366 |
| 8,881,468 | B2 * | 11/2014 | McMullen | E06B 1/62 248/224.8 |
| 10,041,693 | B2 | 8/2018 | Rheaume | |
| 2005/0044808 | A1 * | 3/2005 | Prenn | E04D 13/03 52/200 |
| 2007/0101664 | A1 * | 5/2007 | Hoy | E04D 13/1407 52/198 |
| 2012/0073239 | A1 * | 3/2012 | Haines | E04D 13/1475 52/745.21 |
| 2012/0178357 | A1 | 7/2012 | Rheaume | |
| 2015/0087216 | A1 | 3/2015 | Stover et al. | |
| 2016/0221418 | A1 | 8/2016 | Stover et al. | |
| 2018/0112410 | A1 * | 4/2018 | DeGraan | E04D 13/1473 |

* cited by examiner

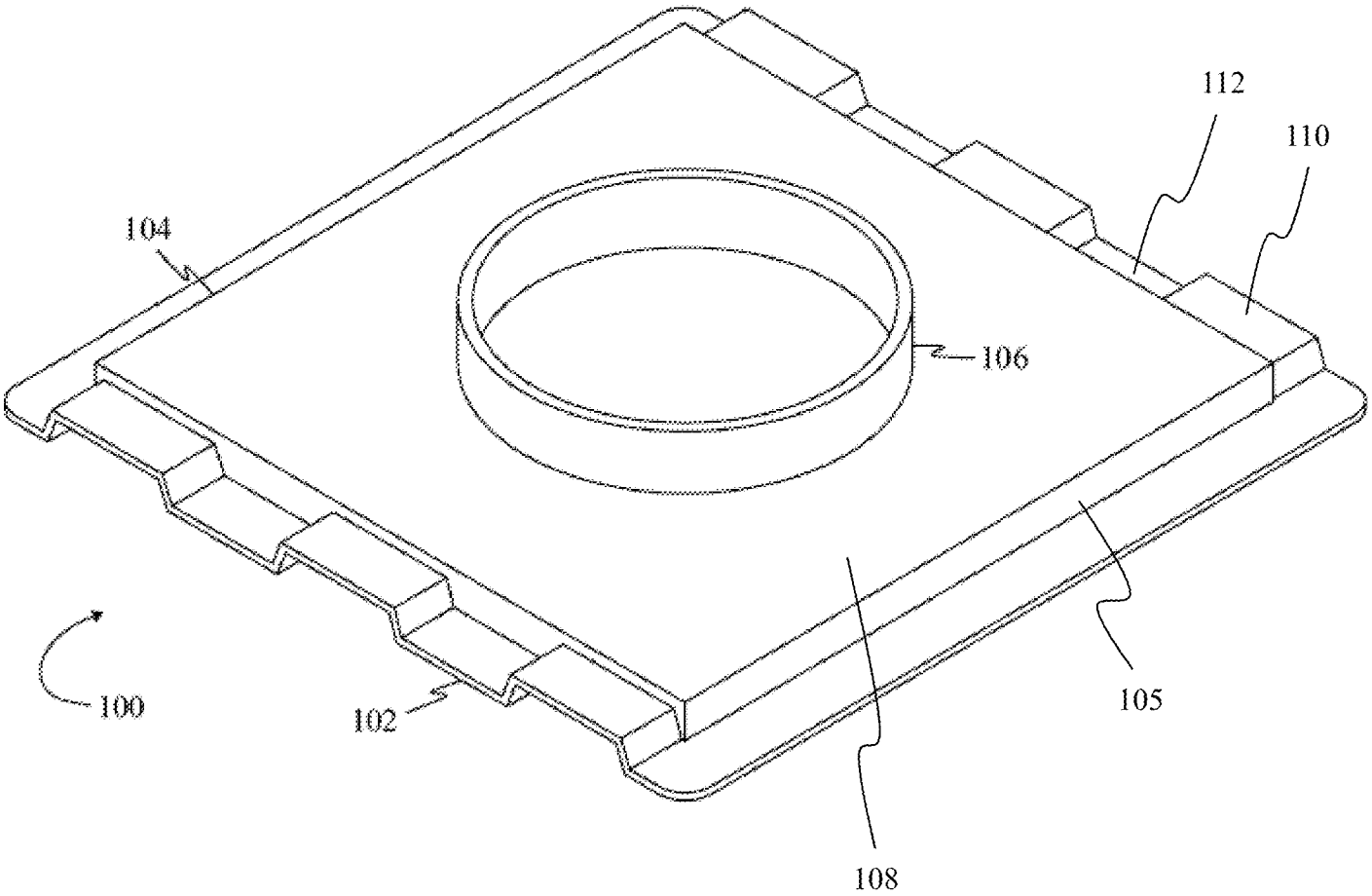
Fig. 1a
[AMENDED]

SHIPPING CONTAINER ADAPTER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This is a reissue application of U.S. application Ser. No. 15/497,684, filed on Apr. 26, 2017, now U.S. Pat. No. 10,723,547, issued on Jul. 28, 2020, the entire disclosure of which is hereby incorporated by reference.*

BACKGROUND OF THE INVENTION

1. Field of the Invention

The present invention is in the field of cargo container attachments, particularly, attachment adapters.

2. Description of Related Art

In recent years, usage of cargo containers, often called cargotainers, for construction of home, businesses, and offices has increased. This may be due to a number of reasons: relatively low cost compared to traditionally available options, availability of shipping containers, and overall value. In an effort to make repurposing of a cargo container more economical, owners may opt to do refurbishing work themselves. However, due to the corrugated nature of the surfaces of cargo containers, adding a vent or other attachments may require more skill, more time, and more equipment than the owners may possess. Hiring a professional to do refurbishing may be the only option for many people, which may be costly.

Additionally, presently existing solutions for a typical person may only be a stopgap, and may not be long-lasting, as the solutions may be prone to environmental deterioration, such as rust, or simply may not be attached securely enough, to be used as a permanent solution. Therefore, what is clearly needed is a relatively easy, and long-lasting way for an average person to add attachments to cargo container.

BRIEF SUMMARY OF THE INVENTION

In one embodiment of the present invention, an adapter for a vent appliance for a cargo container having corrugated panels is provided, comprising a base portion formed of sheet material, having an outer boundary and an inner boundary, the inner boundary enclosing an area sufficient to accommodate a twelve-inch diameter circle, the base portion shaped to closely conform to geometry of the corrugated panels of the cargo container, an intermediate portion joined in an airtight manner to the inner boundary of the base portion, presenting a surface at a height above an upper extremity of the corrugated geometry of the base portion, and an interface providing a through opening in the surface of the intermediate portion within the area enclosed by the inner boundary of the base portion.

In one embodiment, the boundaries of the base portion are rectangular, the inner boundary having an overall length and width dimension, each dimension greater than twelve inches. Also in one embodiment, the surface of the intermediate portion is a flat surface, and the interface providing a through opening in the surface comprises a short cylindrical section joined to be airtight with the surface. Also in one embodiment, the boundaries of the base portion are rectangular and the surface of the intermediate portion is a flat surface, having an overall length and width sufficient to implement a door or a window through the surface of the intermediate portion. Also in one embodiment, the adapter is formed of fiberglass-reinforced plastic. And in one embodiment the adapter has a plurality of through-holes around a periphery of the base portion, for engaging fasteners to fasten the base portion to a corrugated panel of the cargo container.

In another aspect of the invention, an adapter system for a vent appliance for a cargo container having corrugated panels is provided, comprising an adapter having a base portion formed of sheet material, having an outer boundary and an inner boundary, the inner boundary enclosing an area sufficient to accommodate a twelve-inch diameter circle, the base portion shaped to closely conform to geometry of the corrugated panels of the cargo container, an intermediate portion joined in an airtight manner to the inner boundary of the base portion, presenting a surface at a height above an upper extremity of the corrugated geometry of the base portion, and an interface providing a through opening in the surface of the intermediate portion within the area enclosed by the inner boundary of the base portion, and a gasket having thickness and upper and lower surfaces, formed in the geometry of the base portion of the adapter, for providing a seal between the adapter and a corrugated panel of the cargo container.

In one embodiment, the upper and lower surfaces of the gasket have an adhesive coating, for adhering the gasket to both a corrugated panel of the cargo container, and to the base portion of the adapter. Also in one embodiment, the gasket further comprises peel-off paper or plastic coverings over the adhesive coatings.

In another aspect of the invention a method for adapting a vent appliance to a cargo container having corrugated panels is provided, comprising providing an adapter having a base portion formed of sheet material, having an outer boundary and an inner boundary, the inner boundary enclosing an area sufficient to accommodate a twelve-inch diameter circle, the base portion shaped to closely conform to geometry of the corrugated panels of the cargo container, an intermediate portion joined in an airtight manner to the inner boundary of the base portion, presenting a surface at a height above an upper extremity of the corrugated geometry of the base portion, and an interface providing a through opening in the surface of the intermediate portion within the area enclosed by the inner boundary of the base portion, cutting an opening through a corrugated panel of the cargo container, the opening sized to be within the inner boundary of the adapter, placing a gasket having thickness and upper and lower surfaces, formed in the geometry of the base portion of the adapter, for providing a seal between the adapter and a corrugated panel of the cargo container, in a position around the opening cut through the corrugated panel of the cargo container, and placing the adapter onto the gasket placed on the corrugated panel of the cargo container.

In one embodiment of the method, the gasket further comprises adhesive coatings on the upper and lower surfaces, covered by a paper or plastic film, further comprising a step for peeling away the paper or plastic films before placing the gasket. Also in one embodiment, the gasket and the base portion of the adapter have a plurality of matching holes for fasteners, and further comprising a step for inserting and securing fasteners through the holes into the corrugated panel of the cargo container. And in one embodiment the method further comprises a step for joining the vent appliance to the interface in the intermediate portion of the adapter.

*The base may comprise at least two upper corrugated portions that are each configured to align with corrugated panels of the shipping container. The intermediate section may include a sidewall configuration that is vertical. The sidewall configuration may be extended upward to a common height above an upper extremity of the at least two ridged portions of the base. The intermediate section may be connected with the at least two ridged portions and defines a space between the top surface and the sidewall configuration. The base may further include lower corrugated portions that are each dipped relative to the at least two upper corrugated portions and positioned between the at least two ridged portions. The collar may be separated from the at least two upper corrugated portions by the intermediate section. The base portion may have upper corrugated portions and lower corrugated portions that define an inner boundary having an area, and the upper corrugated portions and lower corrugated portions of the base portion are shaped to closely conform to corrugated panels of the shipping container. An intermediate section may include sidewalls. Each sidewall may be joined in an airtight manner along a full length of an edge of the area of the inner boundary of the base portion, and the sidewalls may be extended upward to a common height above an upper extremity of the ridged portions of the base portion and may include a top surface joined to the sidewalls at upper edges of the sidewalls. The intermediate section may be connected to the upper corrugated portions and the lower corrugated portions and define a space between the top surface and the sidewalls and within the area of the inner boundary. The top surface may be horizontal and planar, and the sidewalls may be vertical relative to the base portion. The mesh may extend from the collar and over the space enclosed by the top surface, the sidewalls, and the inner boundary. An intermediate section may have a sidewall configuration extended from the inner boundary and defines a space between the sidewall configuration and within an area of the inner boundary.*

BRIEF DESCRIPTION OF THE SEVERAL VIEWS OF THE DRAWINGS

FIG. 1a is an isometric view of a shipping container adapter according to one embodiment of the present invention.

FIG. 1b is a top view of the shipping container adapter shown in FIG. 1a.

DETAILED DESCRIPTION OF THE INVENTION

What is generally provided in embodiments of the present invention is an adapter shaped substantially to the corrugated sides or roof of a shipping container, to allow a person to easily add attachments while maintaining a weatherproof seal.

Figure 1B:
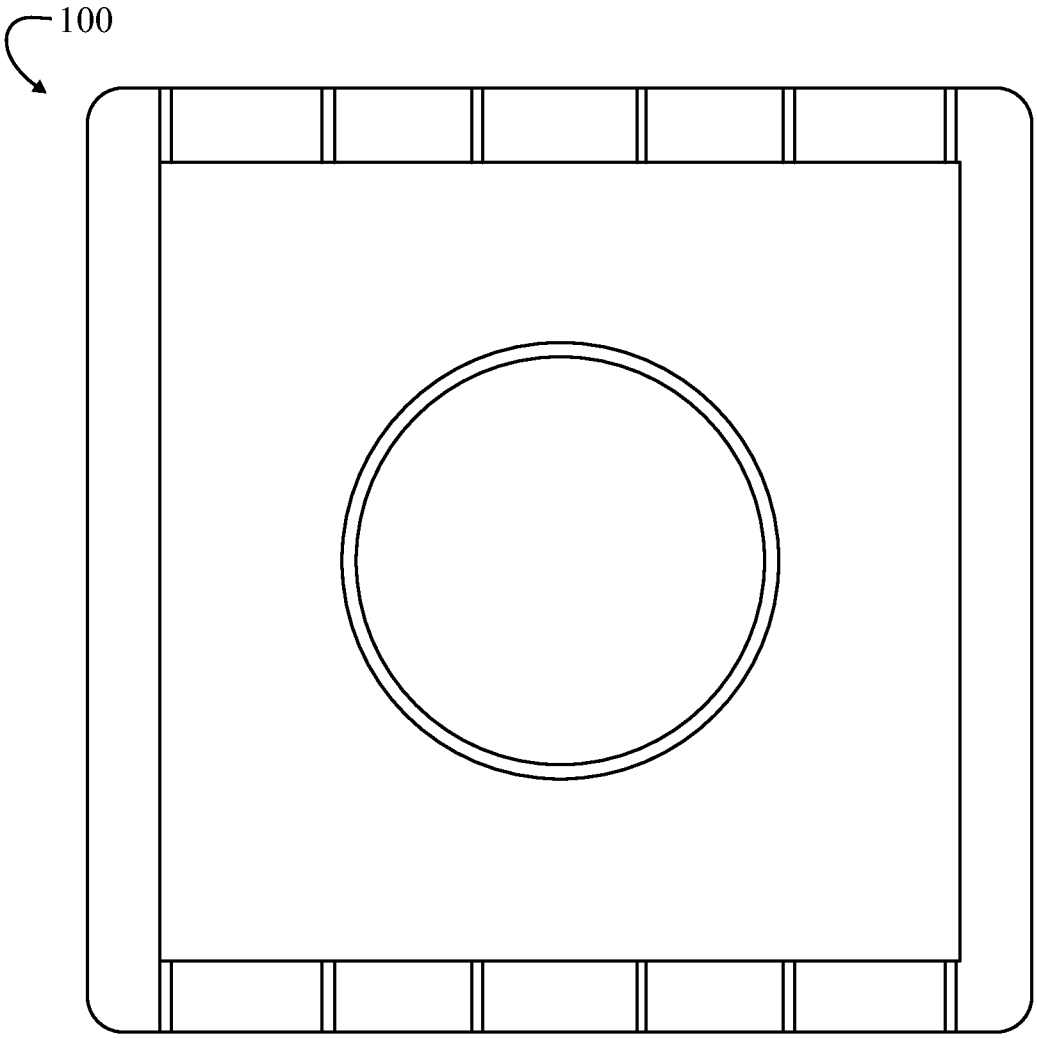
Figure 1C:
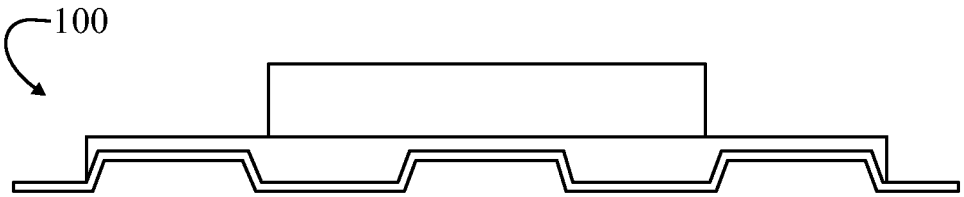
FIG. 1c is a side view from the bottom of the shipping container adapter shown in FIGS. 1a and 1b.

FIGS. 1a to 1c are views of various angles of a cargo container adapter 100 according to one embodiment of the present invention. Cargo container adapter 100 comprises a base 102[.] *connected with* an intermediary section 104 *through a sidewall configuration 105*, and a collar 106 *connected with the intermediate section 104 through a top surface 108. The base 102 includes upper and lower corrugation portions 110, 112 to connect with corrugated panels of a cargo container.* Adapter 100 may be constructed with a flexible and durable material, such as fiberglass-reinforced plastic (FRP), so that adapter 100 may conform its shape slightly to fit on imperfect cargo containers. The material may also possess a high degree of UV-resistance so that adapter 100 may be less susceptible to sun damage after being installed. Base 102 is shaped to substantially fit onto the ridges and grooves of the corrugated roof of a cargo container. In other embodiments, the base *102* may be formed to fit on other surfaces with ridges and grooves of different shapes and sizes, such as the side panels, the rear panel, or the door of a cargo container. Base 102 may also be constructed with different sizes, bigger or smaller, depending on the attachment a user seeks to install.

Intermediary section 104, which is positioned between base 102 and collar 106, acts as sort of a funnel. While base 102 sits flat on a surface of the cargo container to create a seal around the perimeter of adapter 100, intermediary section 104 may be hollow. The size of intermediary section 104 in this embodiment is substantially larger than the diameter of collar 106, thus allowing one to cut an opening with a diameter larger than the diameter of collar 106. This may allow more surface area for air to disperse as it enters, or gather as it exits. The size difference between intermediary section 104 and collar 106 also allows for more flexibility in installing adapter 100, since the extra space may allow the user to be more lenient towards size and positioning of cutting an opening. In other embodiments, the size and shape of the intermediary portion may be any shape or size, depending on the needs and requirements of the user.

Collar 106 in this example protrudes from intermediary section 104 at a distance to allow enough area to fasten a venting device to the collar. In this embodiment, collar 106 has a diameter sized to fit a standard 12" whirlybird wind turbine, or a powered ventilation device. In other embodiments, the collar may be adapted for various shapes and sizes to fit other devices, for example, and without limitation, the collar may take a square shape, or the collar may protrude more or less. In other embodiments, still, the collar may not be present at all. This may be useful in a case, for example, where a user seeks to install a skylight or a window.

Figure 2:
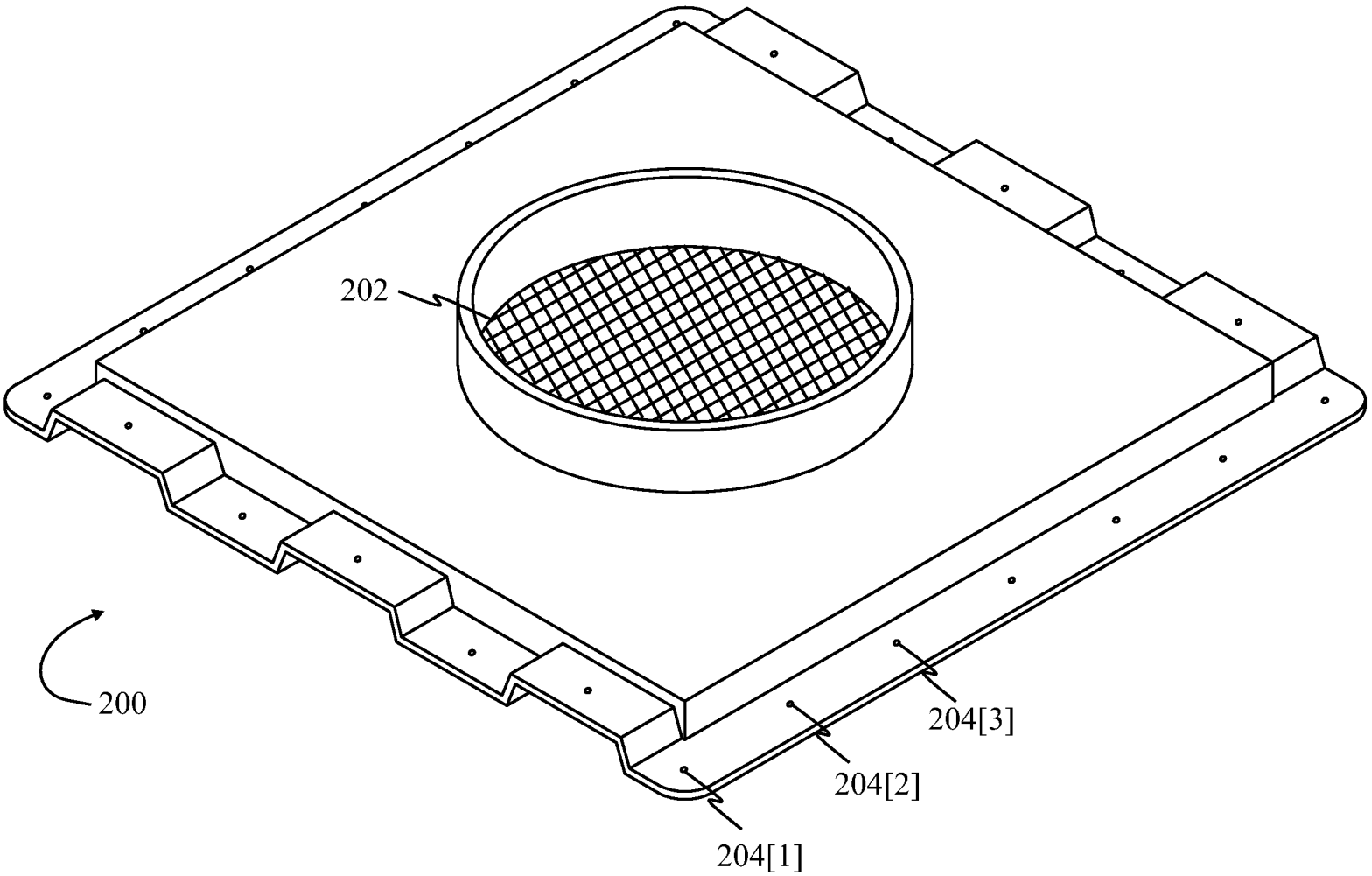
FIG. 2 is an isometric view of a shipping container adapter according to another embodiment of the present invention.

FIG. 2 is an isometric view of a cargo container adapter 200 according to another embodiment of the present invention. Adapter 200 may be identical to cargo adapter 100, except adapter 200 may have a mesh screen 202 installed, and pre-drilled holes 204[1 . . . n] (henceforth referred to collectively as holes 204). Mesh screen 202 is a removable attachment which may help prevent debris or other particles from entering through the vent. In other embodiments, the mesh screen may be replaced with other types and sizes of mesh screens, for example one with finer openings, or even an air filter.

Holes 204 may be pre-drilled to fit standard screws, or other fastening means. A user may additionally use holes 204 as a guide to mark or drill holes onto surfaces of a cargo container. The use of fasteners may be best suited when adapter 200 is intended to be mounted vertically, such on a wall or door, or when adhesive may not be secure enough.

It should be understood that the features shown in the above embodiments are not required to be present together, and other embodiments may possess any combination of features found in the above example embodiments without deviating from the inventive concept of the present invention.

Figure 3:
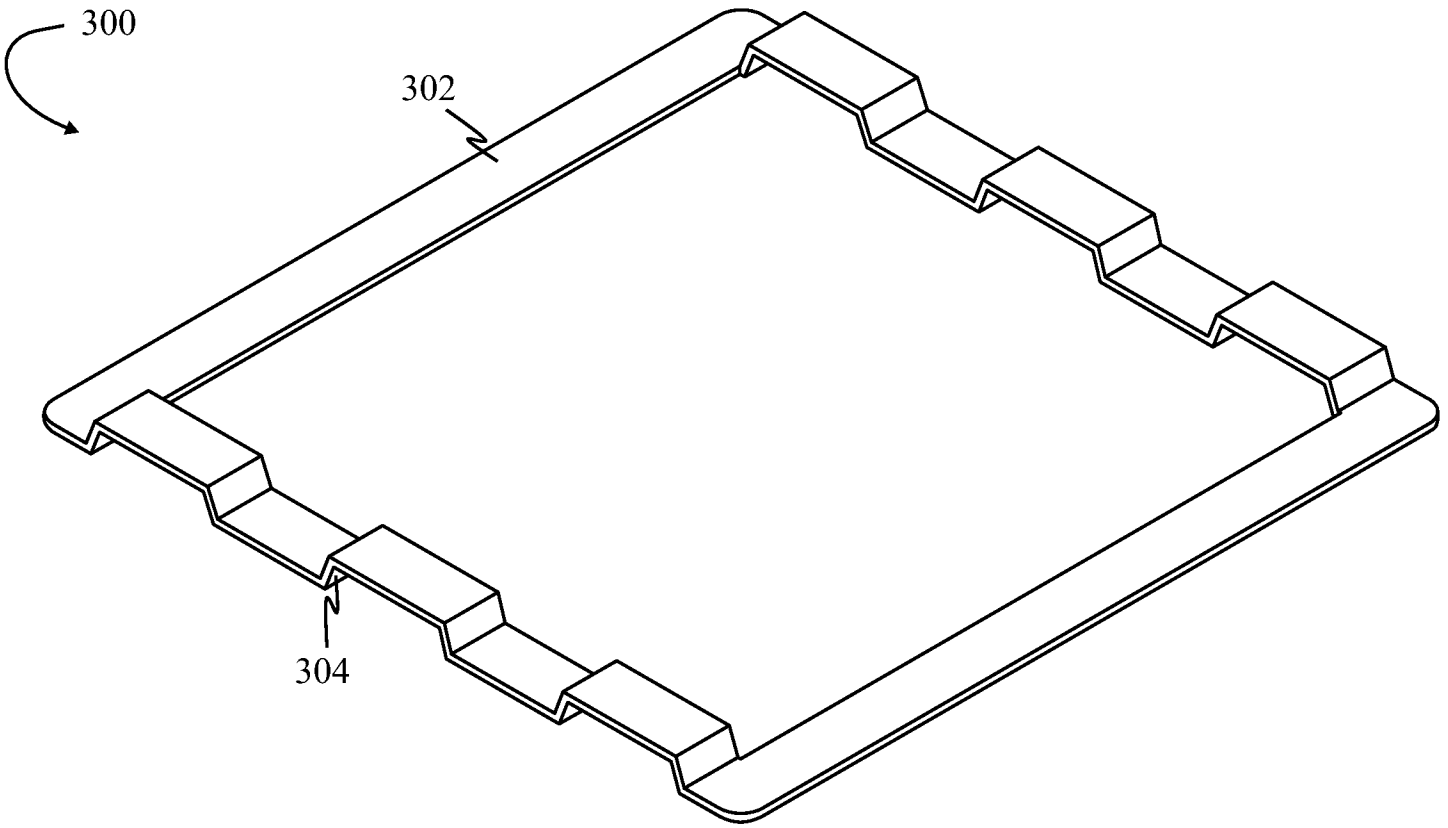
FIG. 3 is an isometric view of a gasket that may be used in conjunction with the shipping container adapter shown in FIG. 1a to FIG. 1c according to one embodiment of the present invention.

FIG. 3 is an isometric view of a sealing gasket 300 according to one embodiment of the present invention that may be used with adapter 100. Gasket 300 in this embodiment is shaped substantially like the shape of base 102, and is designed to form a weatherproof seal. Gasket 300 may be constructed with any material commonly used for creating weatherproof seals, such as rubber or nylon. In other embodiments, other sealants, such as silicone or caulk, may be used in place of a gasket. Besides acting as a weatherproof seal, gasket 300 may have strong adhesive readily applied with a protective cover to be removed at time of use: a top surface adhesive layer 302, and a bottom surface adhesive layer 304. This may allow a user to install adapter 100 without screws. However, for heavier attachments, especially when installed vertically, the use of only adhesive may not be an option, and it may be advisable use screws or other fasteners in additional to the adhesive.

Figure 4:
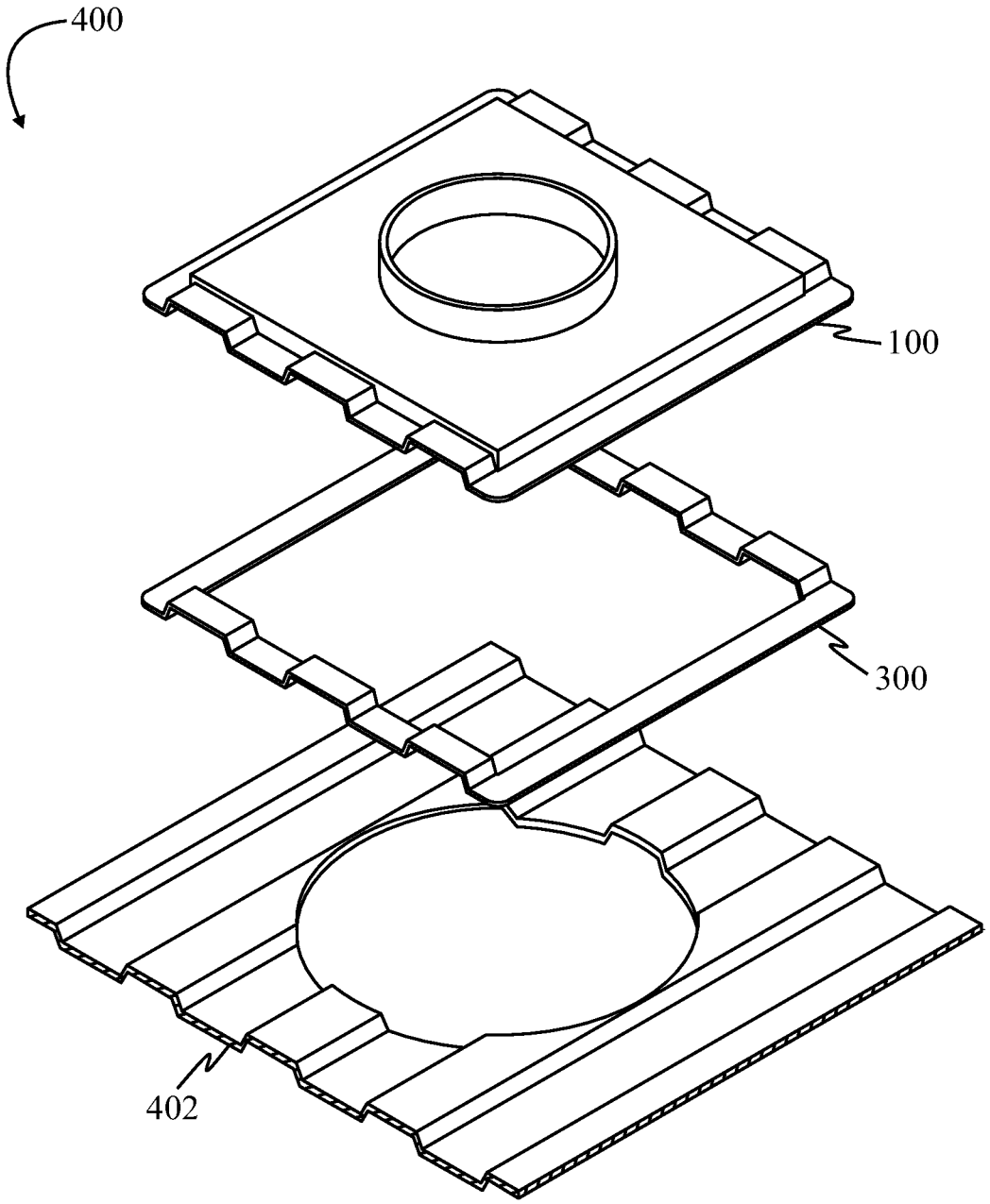
FIG. 4 is an exploded view of a shipping container adapter, a gasket, and a prepared section of a shipping container roof according to one embodiment of the present invention.

FIG. 4 is an exploded view showing an assembly order 400 according to one embodiment of the present invention. Assembly order 400 comprises a cargo container roof 402 (a segment of which is illustrated here) with a hole already cut out by a user, a sealing gasket 300, and a cargo container adapter 100. Sealing gasket 300, with adhesive top surface 302 and adhesive bottom surface 304, makes direct contact with and adheres to roof 402. Adapter 100 is placed directly on top of and also adheres to gasket 300, ensuring adapter 100 is as centered on top of gasket 300 as possible to ensure that a weatherproof seal is established around the perimeter of adapter 100.

Figure 5:
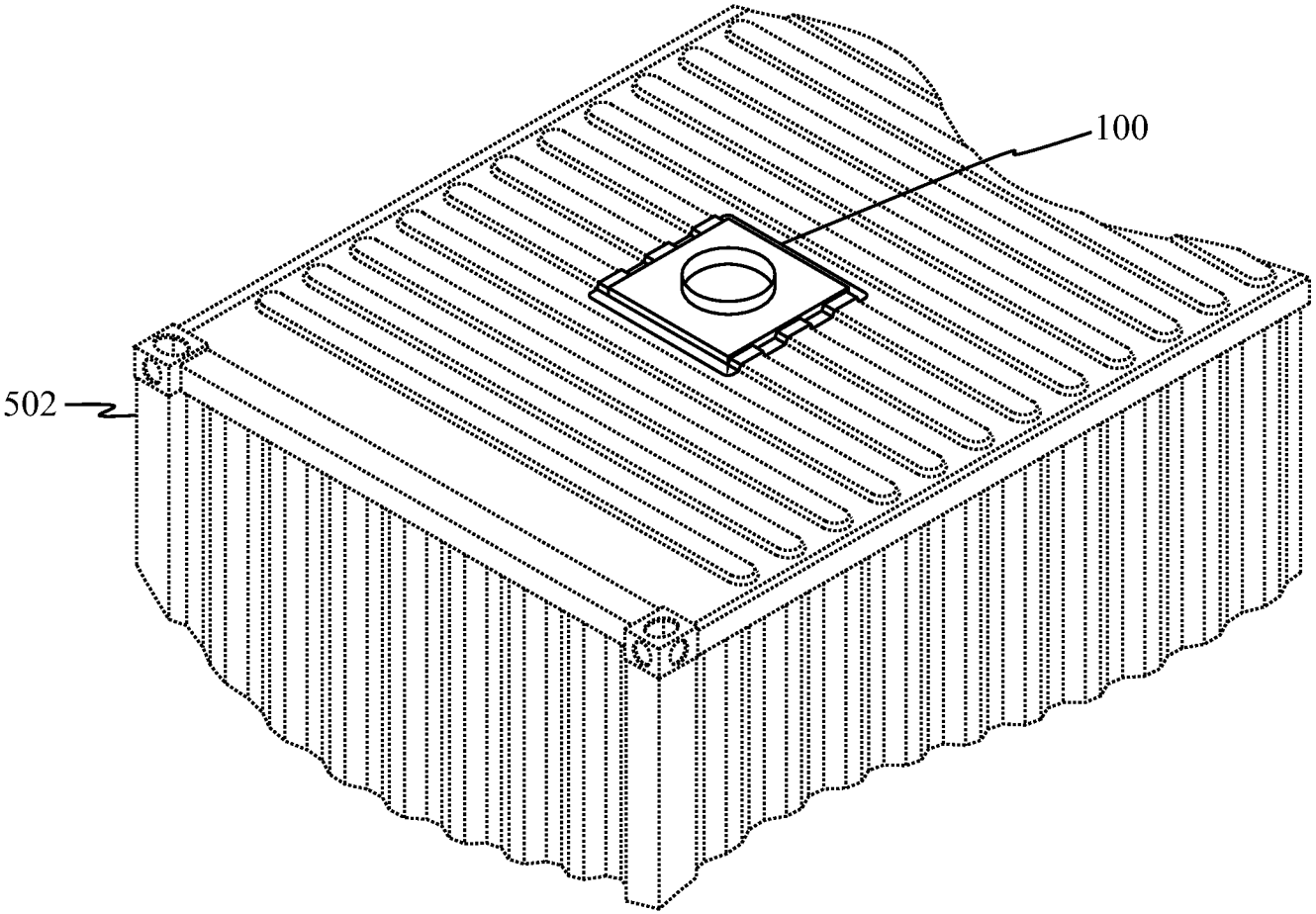
FIG. 5 is an isometric view of a shipping container adapter installed on a roof of a shipping container according to one embodiment of the present invention.

FIG. 5 is an isometric view of an adapter 100 installed on a roof of a cargo container 502 (a portion is shown in FIG. 5 in dotted line) according to one embodiment of the present invention. As apparent by FIG. 5, the ridges and grooves on the roof of cargo container 502 occur in regular intervals. Adapter 100 may be placed at various places, and, due to the regularity of the ridges and dips, adapter 100 may fit and sit flat against the surface on many areas on the roof of cargo container 502. In the event that the cargo container has become misshapen or deformed, adapter 100 may not fit in certain areas, and it may be advisable to test out other areas to find an area in which adapter 100 fits the best in order to maintain a weatherproof seal around the perimeter of adapter 100.

Figure 6:
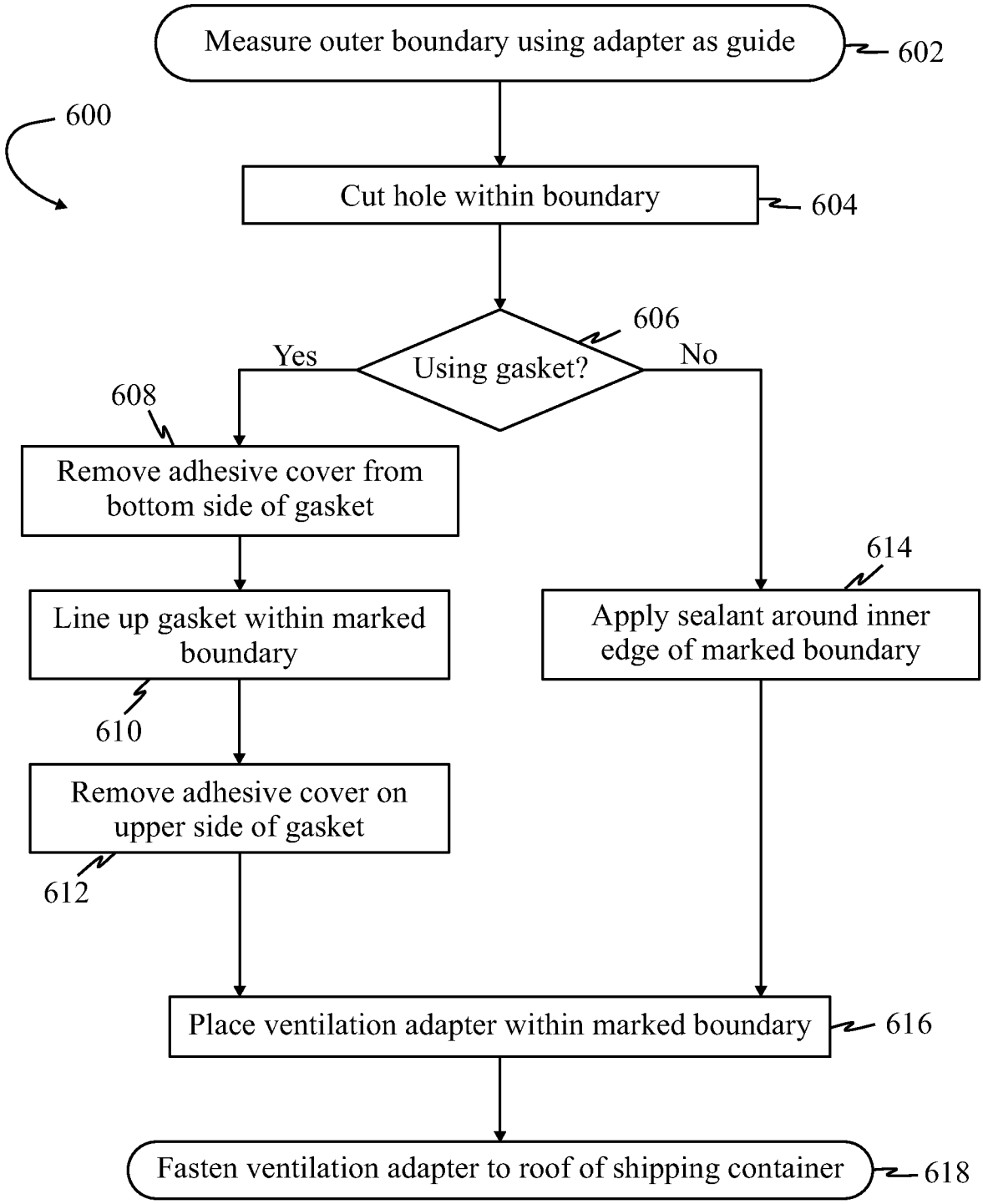
FIG. 6 is a method for installing a shipping container adapter according to one embodiment of the present invention.

FIG. 6 is a flow chart 600 for steps of a method for installing an adapter onto a cargo container according to one embodiment of the present invention. The steps of method 600 takes place after a user has identified an area in which he or she would like to install the adapter, and has done any pre-install steps, such as cleanup, in the area. At step 602, the user places the adapter onto the surface in the area they would like to install the adapter. At this point, the user may mark the outer boundary of the adapter on the area while using the adapter as a guide. At step 604, the user moves the adapter aside, and proceeds to cut a hole that is within the previously marked boundary, with enough space to spare between the outer edge of the cut hole, and the inner edge of the marked boundary for the base of the adapter to sit. At step 606, if the user has opted to use a gasket for sealing, step 608 is reached. At step 608, the user removes a bottom adhesive cover on the bottom of the gasket. At step 610, the user lines up the gasket, now with the bottom adhesive exposed, with the inner edges of the marked boundary and applies firm pressure to ensure a seal is formed all the way around. At step 612, a top adhesive cover is removed from the top of the gasket. Returning to step 606, if the user opts to use another type of sealant, step 614 is reached. At step 614, the user may apply the sealant evenly, and with sufficient quantity around the inner edges of the marked boundary to form a weatherproof seal.

At step 616, after the gasket has been installed or the sealant has been applied, the adapter is placed within the marked boundary, and on top of the gasket or sealant, ensuring the base of the adapter makes substantial contact with the gasket or sealant. At step 618, the adapter is fastened to the surface by applying firm pressure around the perimeters of the base of the adapter to ensure a good seal with the adhesive of the gasket, or with the use of screws or other types of fasteners. After this point, the user is free is install their attachment.

It will be apparent to one with skill in the art, that the embodiments described above are specific examples of a single broader invention which may have greater scope than any of the singular descriptions taught. There may be many alterations made in the descriptions without departing from the spirit and scope of the present invention.

The invention claimed is:

[1. An adapter for a vent appliance for a cargo container having corrugated panels, comprising:

a base portion having an overall width and an overall length, the base portion having a rectangular inner boundary with parallel opposite edges each more than twelve inches in length, the base portion shaped to closely conform to geometry of the corrugated panels of the cargo container;

an intermediate portion comprising four vertical sidewalls, each sidewall joined in an airtight manner along the full length of one of the edges of the inner boundary of the base portion, the four vertical sidewalls extending upward to a common height above an upper extremity of the corrugated geometry of the base portion, and comprising a horizontal planar top surface joined to the four vertical sidewalls at upper edges of the sidewalls; and a tubular collar having an outside diameter equal to or less than twelve inches, extending upward from the horizontal planar top surface of the intermediate portion and opening into a volume enclosed by the intermediate portion.]

[2. The adapter of claim 1, formed of fiberglass-reinforced plastic.]

[3. The adapter of claim 1 further comprising a plurality of through-holes around a periphery of the base portion, for engaging fasteners to fasten the base portion to a corrugated panel of the cargo container.]

[4. An adapter system for a vent appliance for a cargo container having a corrugated panel, comprising:

an adapter having a base portion having an overall width and an overall length, the base portion having a rectangular inner boundary with parallel opposite edges each more than twelve inches in length, the base portion shaped to closely conform to geometry of the corrugated panels of the cargo container, an intermediate portion comprising four vertical sidewalls, each sidewall joined in an airtight manner along the full length of one of the edges of the inner boundary of the base portion, the four vertical sidewalls extending upward to a common height above an upper extremity of the corrugated geometry of the base portion, and comprising a horizontal planar top surface joined to the four vertical sidewalls at upper edges of the sidewalls, and a tubular collar having an outside diameter equal to or less than twelve inches, extending upward from the horizontal planar top surface of the intermediate portion and opening into a volume enclosed by the intermediate portion; and a gasket having thickness and upper and lower surfaces, formed in the geometry of the base portion of the adapter, providing a seal between the adapter and the corrugated panel of the cargo container.]

[5. The adapter system of claim 4 wherein the upper and lower surfaces of the gasket have an adhesive coating, for adhering the gasket to both the corrugated panel of the cargo container, and to the base portion of the adapter.]

[6. The adapter system of claim 5 wherein the gasket further comprises peel-off paper or plastic coverings over the adhesive coatings.]

[7. A method for adapting a vent appliance to a cargo container having a corrugated panel, comprising:

providing an adapter having a base portion having an overall width and an overall length, the base portion having a rectangular inner boundary with parallel opposite edges each more than twelve inches in length, the base portion shaped to closely conform to geometry of the corrugated panels of the cargo container, an intermediate portion comprising four vertical sidewalls, each sidewall joined in an airtight manner along the full length of one of the edges of the inner boundary of the base portion, the four vertical sidewalls extending upward to a common height above an upper extremity of the corrugated geometry of the base portion, and comprising a horizontal planar top surface joined to the four vertical sidewalls at upper edges of the sidewalls, and a tubular collar having an outside diameter equal to or less than twelve inches, extending upward from the horizontal planar top surface of the intermediate portion and opening into a volume enclosed by the intermediate portion;

cutting an opening through the corrugated panel of the cargo container, the opening sized to be within the inner boundary of the adapter;

placing a gasket having a thickness and upper and lower surfaces, formed in the geometry of the base portion of the adapter, providing a seal between the adapter and the corrugated panel of the cargo container, in a position around the opening cut through the corrugated panel of the cargo container; and placing the adapter onto the gasket placed on the corrugated panel of the cargo container.]

[8. The method of claim 7, wherein the gasket further comprises adhesive coatings on the upper and lower surfaces, covered by a paper or plastic film, further comprising a step for peeling away the paper or plastic films before placing the gasket.]

[9. The method of claim 7, wherein the gasket and the base portion of the adapter have a plurality of matching holes for fasteners, and further comprising a step for inserting and securing fasteners through the holes into the corrugated panel of the cargo container, fastening the adapter to the cargo container.]

[10. The method of claim 7 further comprising a step for joining the vent appliance to the tubular collar of the adapter.]

*11. An adapter for a shipping container, comprising:*

*a base that defines an inner boundary, wherein the base comprises at least two upper corrugated portions that are each configured to align with corrugated panels of the shipping container; and*

*an intermediate section comprising a sidewall configuration that is vertical, the sidewall configuration joined in an airtight manner along a full length the inner boundary of the base, the sidewall configuration extended upward to a common height above an upper extremity of the at least two upper corrugated portions of the base, and a top surface joined to the sidewall configuration at upper edges of the sidewall configuration, wherein the intermediate section is connected with the at least two upper corrugated portions and defines a space between the top surface and the sidewall configuration that is configured to disperse air as the air enters or gather air as the air exits the adapter; and*

*a collar extended from the top surface of the intermediate section and opened into the space enclosed by the sidewall configuration and the top surface of the intermediate section,*

*wherein the base, the intermediate section, and the collar are joined in an airtight manner that is sealable against the corrugated panels of the shipping container.*

*12. The adapter of claim 11, wherein the base further comprises lower corrugated portions that are each dipped relative to the at least two upper corrugated portions and positioned between the at least two upper corrugated portions.*

*13. The adapter of claim 11, wherein the inner boundary encloses an area sufficiently large to accommodate the collar.*

*14. The adapter of claim 13, wherein the collar is separated from the at least two upper corrugated portions by the intermediate section, and wherein the collar has a shape of a tube or a square.*

*15. The adapter of claim 14, further comprising:*

*a gasket configured to seal the base against the corrugated panels of the shipping container when the base is secured over the gasket.*

*16. The adapter of claim 15, wherein the base further comprises apertures positioned around a peripheral edge of the base that are configured to receive fasteners to secure the gasket against the corrugated panel of the shipping container so that the base and the collar are airtight against the corrugated panels of the shipping container.*

*17. The adapter of claim 11, further comprising:*

*a mesh connected with the collar, the mesh configured to prevent some foreign objects from passing through the collar.*

*18. The adapter of claim 17, wherein the collar is configured to connect with a powered ventilation device that is*

*configured to vent air from an inside of the shipping container to an external environment.*

*19. An adapter for a shipping container, comprising:*

*a base portion having an overall width and an overall length, the base portion having upper corrugated portions and lower corrugated portions that define an inner boundary having an area, wherein the upper corrugated portions and the lower corrugated portions of the base portion are shaped to closely conform to corrugated panels of the shipping container;*

*an intermediate section comprising sidewalls, each sidewall joined in an airtight manner along a full length of an edge of the area of the inner boundary of the base portion, the sidewalls extended upward to a common height above an upper extremity of the upper corrugated portions of the base portion, and comprising a top surface joined to the sidewalls at upper edges of the sidewalls, wherein the intermediate section is connected to the upper corrugated portions and the lower corrugated portions and defines a space between the top surface and the sidewalls and within the area of the inner boundary that is configured to disperse air as the air enters or gather air as the air exits the adapter; and*

*a collar extended from the intermediate section and comprising a through opening that extends to the top surface of the intermediate section to the space enclosed by the top surface and the sidewalls; and*

*a mesh connected with the interface so that debris is prevented from entering the space.*

*20. The adapter of claim 19, wherein the top surface is horizontal and planar, and wherein the sidewalls are vertical relative to the base portion.*

*21. The adapter of claim 19, wherein the upper corrugated portions are separated from the interface by the intermediate section so that the space allows a user to be more lenient towards size and positioning of cutting an opening on the shipping container.*

*22. The adapter of claim 19, wherein the collar is connectable with a powered ventilation device that is configured to vent air from the space to an external environment.*

*23. The adapter of claim 19, further comprising:*

*a gasket configured to seal the base portion and the interface against the corrugated panels of the shipping container when the base portion is secured over the gasket.*

*24. The adapter of claim 23, wherein the gasket is flexibly structured so that the gasket conforms to the upper corrugated and grooved portions and to the corrugated panels of the shipping container.*

*25. The adapter of claim 23, wherein the gasket and the base portion are connectable by fasteners that extend through holes in the gasket and the base portion.*

*26. The adapter of claim 19, wherein the mesh extends from the interface and over the space enclosed by the top surface, the sidewalls, and the inner boundary.*

*27. The adapter of claim 19, wherein the base portion, the intermediate section, and the interface are formed in an airtight manner.*

*28. A method, comprising:*

*cutting an opening through a shipping container;*

*connecting a gasket with corrugated panels of the shipping container at the opening; and*

*securing an adapter over the corrugated panels of the shipping container,*

*wherein the adapter comprises a base that is shaped to align with a geometry of the corrugated panel of the shipping container and defines an inner boundary, an intermediate section that has a sidewall configuration joined to the inner boundary in an airtight manner and defines a space between the sidewall configuration and within an area of the inner boundary that is greater than twelve inches and configured to disperse air as the air enters or gather air as the air exits the adapter, and a collar that extends from a top surface of the intermediate portion that is connected with the sidewall configuration in an airtight manner,*

*wherein the space has a larger boundary than a diameter of the collar so that a user has more lenience towards size and positioning of cutting the opening, and*

*wherein the opening through the shipping container has a diameter that is larger than a diameter of the collar.*

*29. The method of claim 28, further comprising:*

*before cutting the opening, marking a cutting area on the corrugated panels of the shipping container for cutting of the opening.*

*30. The method of claim 28, wherein the base, the intermediate section, and the collar of the adapter are formed in an airtight manner.*

* * * * *